Oct. 20, 1964  W. A. KLEIN ETAL  3,153,599
METHOD FOR DUSTING TUBULAR FILM
Original Filed April 24, 1959  2 Sheets-Sheet 1

INVENTORS.
Walter A. Klein
Henry A. Lincoln
BY
Robert B. Ingraham
AGENT

Oct. 20, 1964 W. A. KLEIN ETAL 3,153,599
METHOD FOR DUSTING TUBULAR FILM
Original Filed April 24, 1959 2 Sheets-Sheet 2

INVENTORS.
Walter A. Klein
Henry A. Lincoln
BY
Robert A. B. Ingraham
AGENT

United States Patent Office 3,153,599
Patented Oct. 20, 1964

3,153,599
METHOD FOR DUSTING TUBULAR FILM
Walter A. Klein, Midland, and Henry A. Lincoln, Beaverton, Mich., assignors to The Dow Chemical Company, Midland, Mich., a corporation of Delaware
Original application Apr. 24, 1959, Ser. No. 808,692, now Patent No. 3,028,834, dated Apr. 10, 1962. Divided and this application July 14, 1961, Ser. No. 124,093
5 Claims. (Cl. 117—18)

This invention relates to a method for supplying a uniform coating of powdered material to the surface of plastic films or other sheets, especially to reduce the electrostatic cling and tendency to "block" which is characteristic of many such sheets.

It is well known that many types of sheet material, especially those comprising synthetic plastics, are highly dielectric and that such sheets have a normal tendency to cling to other similar sheets. It is also known that this clinging tendency is aggravated by accumulation of an electro-static charge thereon, as may be encountered during extrusion of the sheet and in such subsequent operations as winding into or out of storage rolls, or in other manipulations wherein the sheet surface is subjected to friction.

It is a conventional and normal practice to apply an anti-sticking agent to the surfaces of many sheet materials to reduce their clinging tendency. Numerous powders or dusts have been proposed and are used for such purposes. The choice in any given instance depends largely on the intended use of the treated sheet. Plastic films intended for use as food wrappers are commonly dusted with starch. Sheets intended for industrial or non-food uses are often dusted with such other agents as talc, mica, various polymer powders and assorted chemicals that have anti-static properties. Such powders have been applied to the surface of the dielectric sheet by such means as sifting or aspirating the powder from a continuously diminishing supply. These methods necessarily result in the deposition of varying doses of the powder per unit area of the sheet surface. Consequently, the extent to which the clinging tendency is overcome has varied according to the amount of powder remaining in the duster at the moment each area is treated.

As is apparent, more uniform and controllable results would be desirable to attain in such dusting operations. Such dusts should be uniformal distributed across the surface of the film.

It would be particularly desirable and extremely advantageous for a method to be available which would deliver to the surface of such a dielectric film a relatively uniform and constant supply of dust. It would be most advantageous to have available a method to supply such a uniform coating of dust to a film extruded in tubular form. A further very desirable feature would be to have a method that would accomplish such a uniform distribution of dust across the surface of the film and prevent the escape of excess dust into the surrounding area. It would be more desirable if such an excess dust were removed from the air without the sue of air filters and if this dust could be disposed of as an aqueous suspension or slurry.

Therefore, it is the principal object of this invention to provide a method for supplying dust to a dielectric sheet surface capable of delivering the dust to such surface at a controlled rate which is independent of the remaining inventory of dust in the apparatus. Related objects also appear hereinafter.

These and other advantageous results, purposes and benefits may be achieved with the method in accordance with the present invention which comprises, in combination, a dust metering and dispersing unit adapted to supply a relatively constant supply of dust to an air stream wherein it is dispersed. The unit may advantageously be in combination with a dusting hood comprising an inner chamber and an outer chamber so constructed and arranged that an air suspension of dust is fed to the inner chamber through which the tubular film being dusted is passed with its outer surface in contact with the dust laden atmosphere. The outer chamber surrounds the entire dusting chamber. The hood, in addition, may advantageously be in communication with an air washing venturi unit.

More particularly, an apparatus for the practice of the method of the invention comprises a dust metering unit that, advantageously, is in communication with a dust supply source and dusting hood.

The dust metering unit is a dust metering and dispersing pump comprising a housing defining a generally discoid cavity having an axis of generation and generally radially opposed circumferentially disposed gas inlet and outlet ports and a circumferentially disposed solids inlet port; a bearing means coaxial with said axis, said cavity having walls generally normal to said axis; the walls adjacent to the solids inlet port in greater proximity to each other than the cavity walls that are remotely disposed from the solids inlet. Within the cavity there is provided a rotatable rotor having radially extending protuberances circumferentially affixed thereon; the rotor, including the protuberances thereon, closely approximating the dimensions of the cavity. The housing defines a communication channel having an outlet end directed toward the circumference of the protuberated rotor.

The gas outlet port of the dust metering unit is advantageously in communication with the dust inlet port of a dusting hood which comprises a generally cylindrical inner housing that is circumferentially grooved on its inner surface. The inner housing having provided therein has at least one tangential entry port. The inner housing is carried by suitable supporting means within an outer housing. The outer housing is provided with a circumferentially disposed discharge port. Both the outer housing and the inner housing are arranged substantially coaxially and concentrically so as to define an annular communication channel therebetween. The smaller diameters of the housings are substantially equal and define a generally coaxial passageway. A conduit is provided passing through the outer housing and in communication with the tangential dust entry port.

The circumferentially disposed port of the dusting hood is in communication with the upstream end of a device or unit that comprises a venturi tube having walls, an upstream end, a down-stream end and a restriction intermediate to these ends; and a spray nozzle having a discharge means and a supply port. The discharge means of the spray nozzle is arranged coaxially with said venturi tube and is directed toward the discharge end. A gas supply means and a liquid supply means are in communication with the nozzle supply port.

When applying dusts to surfaces of tubular film passing through the dusting hood, air and dust are supplied to the dust metering and dispersing units. The dust is carried to the inner chamber of the dusting hood, wherein it contacts the film. Dust and air overflowing from the inner chamber of the dusting hood are drawn into the outer chamber of the hood by the action of air and water supplied to the venturi air washer. In the air washer, the air is rendered substantially dust-free by means of intimate contact with the air-water spray issuing from the spray nozzle.

Further features and advantages of the invention will become more apparent in the following description and specification, taken in connection with the accompanying drawing wherein.

Figure 1:
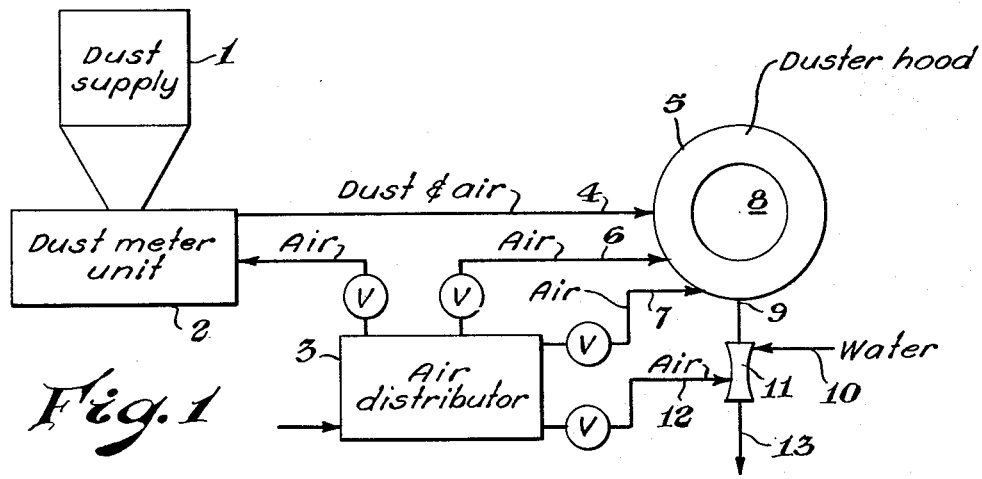
FIGURE 1 is a flow sheet showing generally the operation of the method and apparatus.

There is delineated in FIGURE 1 a flow sheet illustrating the operation of the invention. A dust supply 1 is in communication with a dust metering and dispersing unit 2. Compressed air is fed to the metering and dispersing unit 2 from the distribution manifold 3. The discharge from the metering unit 2 of a dust in air is fed through line 4 to the duster hood 5. The air supplies 6 and 7 are also fed through the duster hood 5 from the air manifold 3. A tubular film passing through the opening 8 in the duster hood 5 comes in contact with dust laden air. The dust laden air then passes through the discharge port 9 into the venturi 11 where it is drawn by the aspirating action of water entering through the line 10 and the air from the air distributor block 3 entering through the line 12. Water, containing the dust removed from the air, then flows by gravity through the discharge line 13 into an open sewer or drain (not shown) where the trapped air is released.

Figure 2:
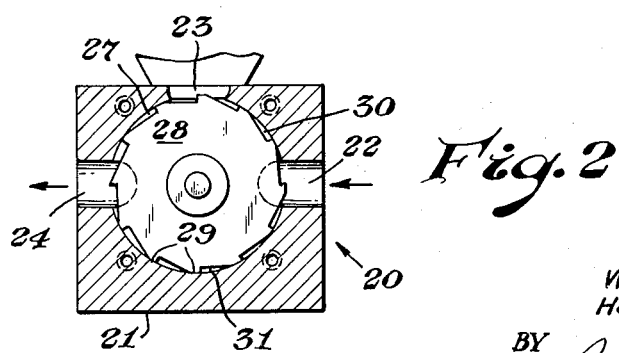
FIGURE 2 is a sectional view of the dust metering and dispensing unit.

Illustrated in FIGURE 2 is the pump disperser 20 comprising a housing 21 having a gas inlet port 22, a solids inlet port 23, and a powder inlet port 24. Within the cavity 27 is located a rotating rotor 28 having a plurality of protuberances 29. The wall 30 of the cavity 27 is positioned closer to the rotor 28 than the wall 31 of the cavity 27.

Figure 3:
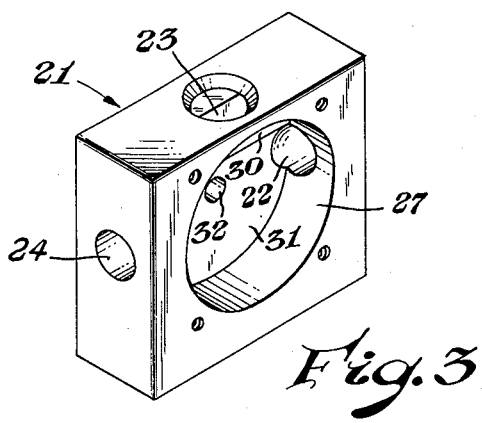
FIGURE 3 is a perspective view of one side of the metering unit housing.

FIGURE 3 shows an isometric view of one-half of the dispenser housing 21. The wall 30, generally included between the ports 22, 23 and 24, projects closer, or is disposed in greater proximity to, the center line of the cavity than is the wall 31 of the cavity 27. A bearing cavity 32 is provided in the housing 21. The bearing cavity 32 is coaxial within the cavity 27.

Figure 4:
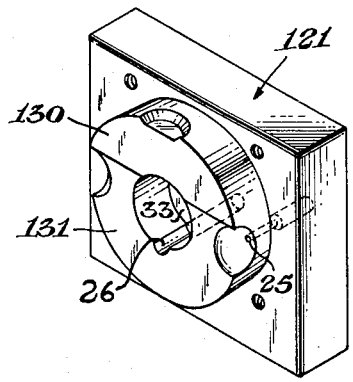
FIGURE 4 is a perspective view of the opposite side of the metering unit housing.

FIGURE 4 illustrates the opposite half of the housing, designated as 121, showing two air inlet ports 25 and 26 both in communication with cavity 27, and wall 130 which is disposed closer to center line of housing than is wall 131. Within the housing half 121 is disposed a cavity 33 smaller than and coaxial with discoid cavity 27. Cavity 33 may function as a bearing cavity and is provided with air inlet or communication channel 26 extending the entire length of the cavity 33.

Figure 5:
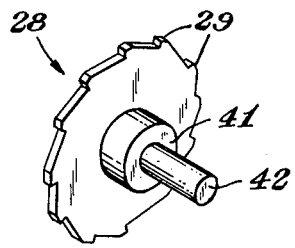
FIGURE 5 is a perspective view of one embodiment of the metering unit rotor.

FIGURE 5 ilustrates one form of a rotor 28 that may be succesfully employed. The rotor 28 has a plurality of teeth or protuberances, each designated by the reference numeral 29, and a hub or a boss 41 carried on a shaft 42.

Figure 6:
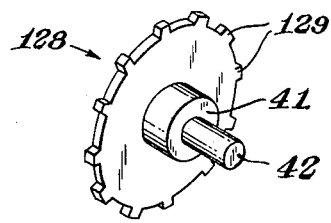
FIGURE 6 shows a view of another embodiment of the metering unit rotor.

In FIGURE 6 there is illustrated an alternate form of a rotor 128 having a plurality of protuberances, each designated by the reference character 129, a boss 41 and a shaft 42. In this embodiment, the protuberances 129 are relatively narrow in width and have generally radially extending faces.

Illustrated in FIGURES 2, 3 and 4 is a housing of a generally rectangular form. Other convenient shapes may be employed. The exterior configuration of the housing is not critical to the operation of the pump. Hence, it may be of any convenient design.

The ports 22, 23, 24 and 25 and 26 may be equipped with internal threads to facilitate the connection thereto of air supply and discharge lines. If desired, compression or sliding joints may be employed. The ports 22 and 24, as illustrated, are diametrically opposed. As will be appreciated by those having the skill of their calling, this represents but one embodiment of the invention. As is apparent, the relative locations of ports 22 and 24 are not particularly critical. Generally, the port 22 should be located from the port 23 at a circumferential distance in excess of the distance between the protuberances and the rotor. A similar limitation applies to the location of the port 24. Although the ports 22 and 24 may be located near the port 23, it is generally desirable for optimum performance to have these ports as far removed from each other as possible. In this way, there is readily allowed as much residence time as possible for the powder-air dispersion in the cavity 27. The ports 22, 23 and 24 are shown disposed in a radially extending manner. They may, in their alternate form, be parallel to the axis of rotation of the rotor. Similarly, the port 25 may be radially disposed. For optimum performance, the ports 22 and 25 should be contiguous.

In FIGURES 3 and 4, alternate sides of the housing are illustrated. The surfaces 30 and 130, when placed in operating position, should have only sufficient clearance to permit free rotation of the rotor plus adequate clearance of at least about 3 particle diameters between rotor 28 and the surfaces 30 and 130. The surfaces 31 and 131 are disposed further from the rotor, thus forming a split channel of communication between the ports 22 and 24. The air entrance port 25 should be located in such a manner that the rotor protuberances or the teeth 29 are cleared of all dust as these teeth pass by this port. Advantageously, air from the port 25 should impinge upon the teeth in a direction parallel to the axis. Suitable operation may be obtained, however, if this air jet impinges radially upon said teeth.

In FIGURE 5 there is a rotor 28 having "rip" teeth or protuberances 29. Such shape of the tooth or protuberance has been found to be advantageous since it effects relatively clean shearing of the powdered material that is cut from the parent mass of dust in inlet 23 of FIGURE 2. The boss 41 is inclined on the rotor as a matter of convenience in affixing said rotor 28 to shaft 42.

In using the pump to meter different varieties of dust, and at different capacities, it is frequently advantageous to exchange the rotor for one having protuberances 29 of different dimensions. The rotor 28, when used for metering small quantities of dust, is frequently constructed from relatively thin material. This makes a satisfactory connection to the shaft 42 rather difficult to achieve without the use of boss 41. However, such a thin rotor may be readily affixed to the shaft by brazing. Alternatively, if desired, the rotor and the shaft may be prepared from a single piece of stock, thus eliminating the use of boss 41.

In FIGURE 6, an alternate design of rotor 128 is illustrated having relatively narrow protuberances 129 with generally radially extending faces. This form is particularly advantageous when used with free-flowing powders that tend to fill the spaces between said teeth 129.

The metering and dispersing pump 2 may be readily fabricated from such usual materials of construction as carbon steel, brass, aluminum, nickel, stainless steel, thermoplastic and thermosetting resins (with and without reinforcing or other agents added), and so forth. A wide variety of dusts may be dispersed in the gas by the use of this apparatus, including, for example, such dusts as starch, mica, talc, pumice, abrasive powders, and the like.

Advantageously, air pressures varying from about 3 pounds to several hundred pounds per square inch may be employed, depending upon the concentration of dust that may be desired in the gas, the particle size of the dust, and the nature thereof. Dispersing devices according to the invention may be operated for periods of several months and longer without plugging or binding. They require but a minimum of maintenance.

Figure 7:
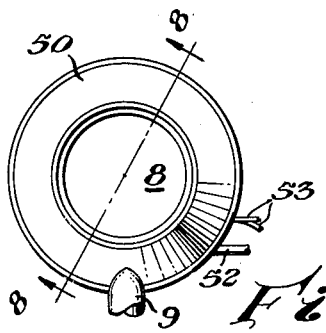
FIGURE 7 shows a plan view of the dusting hood.

A plan view of the dusting hood portion of the present invention is illustrated in FIGURE 7. It comprises a hollow generally cylindrical outer housing 50 defining a passageway 8, a radially positioned discharge port 9, passing through housing 50 is a dust supply conduit 52 and air supply conduits 53. Dust laden air from the metering unit is fed in conduit 52 with an auxiliary air supply fed to the same chamber through the conduits 53. The discharge port 9 is in communication with the air washing venturi tube.

Figure 8:
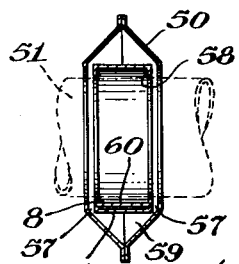
FIGURE 8 shows a cross-sectional view of the dusting hood.
Figure 10:
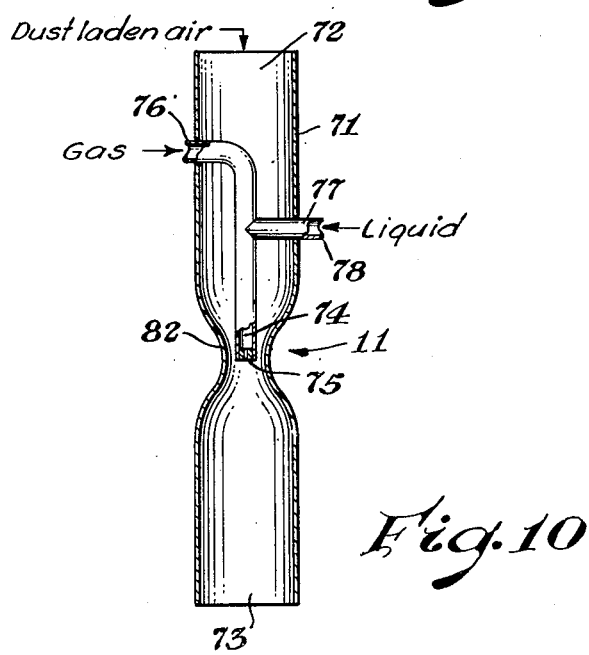
FIGURE 10 illustrates a cross-sectional view of the venturi air washer.

A cross-section of the dusting hood is shown in FIGURE 8 with the outer housing 50 enclosing the inner housing 58. Between the two housings is the annular chamber 59. The inner housing 58 defines the dusting groove 60. Within the passageway 8 is disposed a transparent tubular film 51 to be dusted. The communication channel 61 leading to the tangential entry port (not shown) serves as a mixing and distribution chamber for air as it is entering the conduit 53 and air-dust dispersion entering from conduit 52. The air-dust dispersion leaves the tangential entry port (not shown) enters the dusting groove 60, contacts the tubular film 51 in passageways, enters the annular chamber 59 through the spaces 57 on either end of dusting housing 58. The air-dust dispersion is subsequently removed through the port 9.

Figure 9:
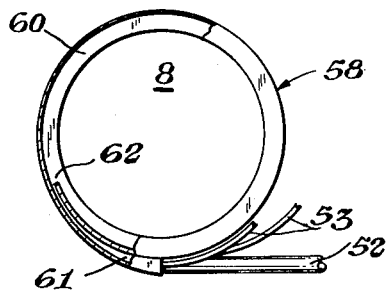
FIGURE 9 illustrates a cross-sectional view of the dusting hood inner housing.

In FIGURE 9, a cross-sectional view of the inner housing 58 is illustrated, showing the converging of the entry ports 53 and 52 into the duct 61, and the duct 61 terminating in the tangential entry port 62.

In operation, a tubular film is passed through the opening 8 while the mixture of dust and air enters the port 52 and air is fed to the port 53. The air from the ports 53 dilutes the air-dust dispersion being fed in the port 52 on entry into the channel 61. Thus, the air-dust dispersion leaves the channel 61 in a tangential manner through the tangential entry port 62. This dust laden air will tend to circulate within the groove 60 and escape via the passageway 8. As the tubular film is passing through the channel 8, intimate contact with the dust dispersion and the surface of the tubular film will result. As reduced pressures are applied to the port 9, air from outside the hood and the dust laden air from the groove 60 is drawn into the chamber 59 and carried out through the port 9.

Groove 60 may be divided to give several parallel grooves. In general, however, such an arrangement is not necessary to employ to obtain good results.

In FIGURES 8 and 9, the chamber 61 is shown as a flattened chamber substantially the width of the groove 60. This embodiment of the invention may be employed most advantageously when a minimum of turbulence within the groove 60 is required. Alternatively, in many cases, the simple tangential entry of a conduit having circular cross-section is adequate. Similarly, the auxiliary air entry ports 53 are used to create turbulence within the channel 61 when powders difficult to disperse are employed. Such auxiliary air entry ports 53 are desirable when a wide particle size range exists in the powder. Larger particles tend to come out of suspension easily and air from the ports 53 is used to insure an adequate dispersion in such cases. Generally, with the most dispersible powders, the use of the auxiliary ports 53 is not required.

Air pressures varying from about 3 to about 100 pounds per square inch may be employed, depending upon the particular material being handled. Continuous operation of the hood provides very satisfactory and uniform powder distribution on the surface of a tube passed through the opening 8. The use of the outer housing 50 generally eliminates the undesirable quantities of dust which usually escape from dusting equipment. There is no great tendency for the dust to build up in the groove 60 or in the annular space 59. Thus, relatively trouble-free operation is readily obtained.

FIGURE 10 illustrates a cross-sectional view of the gas or air washing device. In FIGURE 10, there is shown a venturi tube 11 having an up-stream end 72 and a down-stream end 73. Intermediate between these ends is a restriction 82. Upstream from this restriction is located a spray nozzle 75 which is supported by a supply chamber 74. Entering through the wall 71 of the venturi tube 11 is a liquid supply conduit 77 having an entrance 78. Toward the up-stream end 72 on the supply or mixing chamber 74 is a gase supply conduit 76. The restriction 82 of the venturi tube 11 may be proportioned in accordance with the conventional design equations for such equipment, consideration being given to the conditions and volumes of material that it is required to handle. If less than optimum forwarding action is required, the restriction may be of any generally streamlined form without destroying the function of the device. For optimum performance in any given instance, the precise size and form of restriction can be readily calculated.

The design of the mixing chamber 74, similarly, is not highly critical, although optimum performance is obtained in any given instance when it is constructed to best handle existing specific conditions. The liquid inlet conduit may be randomly placed with respect to the gas inlet conduit. A desirable configuration is shown in FIGURE 1, wherein the gas entering the conduit 76 has a siphoning action on the conduit 77, thereby drawing liquid into the chamber and eliminating the necessity of a pressure feed for the washing liquid.

The spray nozzle 75 may be on any conventional design adapted to give a generally conical spray, and for optimum performance, a nozzle delivering a hollow cone spray is usually most advantageous. It is desirable that the cross-sectional dimension of the spray nozzle 75 and the supply chamber 74 be at a minimum in order that an undesired pressure drop does not appear in the venturi tube 11. The air pressure fed to the gas conduit 76 may be varied from a few inches of water to several hundred pounds, depending upon the design of the specific embodiment desired in the apparatus. Similarly, the liquid fed to the inlet port 78 may be varied from a small negative pressure to several hundred pounds, depending upon the above-mentioned variables.

As the gas pressure is increased to the conduit 71, the quantity of air passing through the venturi tube 11 and entering the upstream end 72 increases. The quantity of liquid mixed with the energizing air tends to vary, depending upon the type of contaminant being removed from the gas passing through the venturi tube 11 and the concentration of the contaminant in said gas. In general, more liquid is required as the quantity of contaminated air being handled is increased. More liquid is also required as the concentration of the contaminant is raised.

The gas washing device may be constructed from any generally self-supporting or rigid material. The venturi tube 11 may advantageously be constructed from the same materials that are employed for construction of the metering and dispersing pump. It is usually desirable for the supply chamber 74, the conduits 76 and 77, and the spray nozzle 75 to be constructed from metals in order to resist the operating pressures. Thermoplastics and thermosetting resins may advantageously be employed if the operating pressures do not exceed the capabilities of the design. When handling abrasive materials, it is advantageous to coat the inner surfaces of the venturi tube 11 and the outer surfaces of the supply chamber 74, the spray nozzle 75, and the supply conduits 76 and 77 with abrasive resistant materials, such as rubbers, thermoplastics, or hard facing alloys.

The washer may be advantageously employed for the removal of small quantities of dust from air in operations such as grinding, wherein the up-stream end 72 is in communication with a collection hood located near a grinding wheel. Air pressure is applied to the conduit 76 and the conduit 77 is connected to a water source at atmospheric pressure located below the level of spray nozzle 75. The air entering conduit 76 will supply adequate reduced pressure to direct the abrasive-retained air into collection hood through the venturi tube. Water siphoned from the supply source through the conduit 76 will effectively remove the dust from the air and prevent undesired contamination of the surrounding area.

The dusting apparatus of the invention has been employed successfully and with highly satisfactory results for applying starch dusts to normally crystalline vinylidene chloride polymer films (i.e., saran films) as they emerge from a tube extruder. Various modifications of the duster hood, the dust metering unit and venturi air washer have been employed for the dusting of flat sheets of film at rates ranging from 3 to 500 feet per minute. No significant operational difficulties were encountered when dry, dispersible dusts were employed. However, when dusts carrying appreciable quantities of water (i.e., sufficient to change their physical handling properties) are employed, tendencies to plug may be encountered.

Under normal operating conditions, the apparatus runs continuously for extended periods of several months and longer, continuously providing a uniform coating of dust to the surface of the dielectric film and removing and cleaning the dust laden air without contamination of adjacent areas. Tendency to give dust patterns or streaks or non-uniform application, as is plainly evident in the conventional types of apparatus that are usually employed for such operation, is absent for all practical purposes when the apparatus of this invention is used.

A venturi gas washer constructed as described and in accordance with the invention was employed to remove starch dust from air continuously for a period of several months and functioned throughout the entire period without requiring appreciable maintenance or cleaning. Similarly, the invention may be employed in numerous other applications where a compact and simple method of gas washing is required.

This application is a divisional application of our copending application, Serial Number 808,692, filed April 24, 1959, now United States Letters Patent 3,028,834, granted April 10, 1962.

It is to be fully understood that many changes and modifications can be entered into the practice of the present invention without substantially departing from its spirit or scope. Hence, it is intended that all of the foregoing specification and description be interpreted and construed as being merely illustrative of certain of the possible embodiments of the invention. In no sense or manner should limiting or restrictive considerations of the invention be entertained excepting in view of its definition as set forth in the appended claims.

What is claimed is:

1. A method of dusting thermoplastic resinous tubular film which comprises continually providing portions of dust, dispersing the dust portions in a gas stream; and circumferentially circulating the resulting dust dispersion about and in contact with said tubular film.

2. A method of dusting thermoplastic resinous tubular film which comprises continually separating substantially uniform portions of dust from a dust mass; dispersing said dust by directing convergent air streams on said sheared portions of dust; then monodirectionally circumferentially circulating the dispersed dust about and against the outer surface of said tubular film.

3. A method of dusting a tubular extruded thermoplastic film which comprises: continually separating substantially uniform portions of dust from a dust mass, dispersing the dust by directing convergent air streams on the sheared portions of dust, monodirectionally circumferentially circulating the dispersed dust in a generally hollow cylindrical configuration about and against the outer surface of the tubular thermoplastic film and subsequently passing the dispersed dust through a liquid spray.

4. A method of dusting tubular film which comprises continually providing portions of a desirable powder which will adhere to the film, subsequently dispersing the portions of the powder in a gas stream to form a uniform dispersion of powder, tangentially directing the resulting powder dispersion into a generally hollow cylindrical configuration circumferentially disposed about the tubular film being dusted, circumferentially circulating the resulting dispersion about and in contact with the adjacent surfaces of the tubular film and subsequently removing the dispersion from the terminal portions of the generally cylindrical configuration, the circumferential circulation being directed in a single direction.

5. A method as in claim 4, wherein the dispersion is passed into a liquid wash after contacting said tubular film.

References Cited in the file of this patent

UNITED STATES PATENTS

| | | |
|---|---|---|
| 461,667 | Chatfield | Oct. 20, 1891 |
| 1,263,858 | Cole | Apr. 23, 1918 |
| 1,400,289 | Humphrey | Dec. 13, 1921 |
| 1,876,251 | Lehman | Sept. 6, 1932 |
| 1,977,985 | Chandler | Oct. 23, 1934 |
| 2,338,096 | Chater | Jan. 4, 1944 |
| 2,358,138 | Blanchard et al. | Sept. 12, 1944 |
| 2,408,812 | Rieke | Oct. 8, 1946 |
| 2,604,185 | Johnstone et al. | July 22, 1952 |
| 2,758,564 | Randall | Aug. 14, 1956 |
| 2,817,310 | Ponzini | Dec. 24, 1957 |
| 2,843,295 | Ricker | July 15, 1958 |

FOREIGN PATENTS

| | | |
|---|---|---|
| 286,637 | Germany | Aug. 24, 1915 |